US012705918B2

(12) United States Patent
Park et al.

(10) Patent No.: US 12,705,918 B2
(45) Date of Patent: Aug. 11, 2026

(54) PIXEL CIRCUIT, DISPLAY DEVICE INCLUDING THE SAME AND ELECTRONIC DEVICE INCLUDING THE SAME

(71) Applicant: Samsung Display Co., LTD., Yongin-si (KR)

(72) Inventors: Hyang-A Park, Yongin-si (KR); Jungwoo Park, Yongin-si (KR); Soo Yeong Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/067,585

(22) Filed: Feb. 28, 2025

(65) Prior Publication Data

US 2025/0371903 A1 Dec. 4, 2025

(30) Foreign Application Priority Data

Jun. 4, 2024 (KR) ........................ 10-2024-0073178

(51) Int. Cl.

*G06V 40/13* (2022.01)
*G09G 3/32* (2016.01)
*G09G 3/3233* (2016.01)

(52) U.S. Cl.

CPC .......... *G06V 40/13* (2022.01); *G06V 40/1318* (2022.01); *G09G 3/3233* (2013.01); (Continued)

(58) Field of Classification Search

CPC .. G06V 40/13; G06V 40/1318; G09G 3/3233; G09G 3/32; G09G 2300/0819; G09G 2360/14

See application file for complete search history.

(56) References Cited

U.S. PATENT DOCUMENTS 8,471,310 B2 * 6/2013 Hynecek ............... H10F 39/802 257/292
8,581,170 B2 * 11/2013 Kurokawa ............. H10D 86/60 250/214 R (Continued)

FOREIGN PATENT DOCUMENTS

KR 10-2130421 B1 7/2020
KR 10-2219821 B1 2/2021

(Continued)

*Primary Examiner* — Michael J Jansen, II

(74) *Attorney, Agent, or Firm* — Womble Bond Dickinson (US) LLP

(57) ABSTRACT

A pixel circuit includes a light emitter including an emission driving transistor to output a driving current based on a data voltage, a write transistor to apply the data voltage to the emission driving transistor in response to a write gate signal, and a light-emitting element to emit light based on the driving current, and a light sensor to sense the light, and including a sensing driving transistor including a first control electrode for receiving a reset voltage and a sensing voltage, and a second control electrode for receiving an adjustable photodiode voltage, for generating a sensing current in response to the sensing voltage, a sensing initialization transistor to apply the reset voltage to the first control electrode in response to a photo initialization gate signal, and a sensing output transistor to apply the sensing current to a sensing line in response to an output gate signal.

19 Claims, 12 Drawing Sheets

(52) U.S. Cl.
CPC ....... *G09G 3/32* (2013.01); *G09G 2300/0819* (2013.01); *G09G 2360/14* (2013.01)

(56) References Cited

U.S. PATENT DOCUMENTS

| | | | | |
|---|---|---|---|---|
| 8,610,696 | B2 * | 12/2013 | Kurokawa | H03K 5/2472 345/207 |
| 10,275,094 | B2 * | 4/2019 | Kim | G06F 3/042 |
| 10,636,931 | B1 * | 4/2020 | Shibata | H10F 39/803 |
| 10,810,936 | B2 * | 10/2020 | Wang | G09G 3/3233 |
| 10,916,197 | B1 * | 2/2021 | Zhang | G09G 3/3258 |
| 10,957,749 | B2 * | 3/2021 | Jung | H10K 59/65 |
| 11,158,258 | B2 * | 10/2021 | Cha | G09G 3/3233 |
| 11,462,188 | B2 * | 10/2022 | Shih | G09G 3/3688 |
| 11,475,701 | B2 * | 10/2022 | Shih | G06V 40/1318 |
| 11,487,373 | B2 * | 11/2022 | Kubota | G06F 3/0412 |
| 11,594,161 | B2 * | 2/2023 | Takatori | H04N 25/77 |
| 11,615,641 | B2 * | 3/2023 | Wang | G06V 40/1318 382/124 |
| 11,837,010 | B2 * | 12/2023 | Park | G06V 40/1306 |
| 11,855,055 | B2 * | 12/2023 | Bok | H01L 25/0753 |
| 11,896,397 | B2 * | 2/2024 | Kim | A61B 5/02108 |
| 11,923,390 | B2 * | 3/2024 | Kim | G06V 40/1318 |
| 11,971,298 | B1 * | 4/2024 | Chen | G01J 1/44 |
| 12,067,936 | B2 * | 8/2024 | Takatori | G09G 3/3233 |
| 12,150,367 | B2 * | 11/2024 | Yamazaki | G09F 9/302 |
| 12,213,357 | B2 * | 1/2025 | Kim | G09G 3/3233 |
| 12,225,742 | B2 * | 2/2025 | Kim | G06F 3/042 |
| 2011/0198484 | A1 * | 8/2011 | Kurokawa | H10D 86/423 250/214 R |
| 2011/0199351 | A1 * | 8/2011 | Kurokawa | G09G 3/3648 341/110 |
| 2012/0175497 | A1 * | 7/2012 | Hynecek | H04N 25/76 250/214 P |
| 2018/0203537 | A1 * | 7/2018 | Kim | G06F 3/0412 |
| 2019/0043420 | A1 * | 2/2019 | Jung | G06V 40/1318 |
| 2019/0279566 | A1 * | 9/2019 | Wang | G06V 40/1318 |
| 2020/0135959 | A1 * | 4/2020 | Shibata | H10F 77/953 |
| 2021/0096678 | A1 * | 4/2021 | Kubota | G06F 3/0412 |
| 2021/0158751 | A1 * | 5/2021 | Cha | H10K 59/65 |
| 2021/0264829 | A1 * | 8/2021 | Takatori | H10F 39/80377 |
| 2021/0320137 | A1 * | 10/2021 | Kim | H01L 25/18 |
| 2021/0406508 | A1 * | 12/2021 | Shih | G06V 40/1318 |
| 2021/0407453 | A1 * | 12/2021 | Shih | G09G 3/3648 |
| 2022/0036825 | A1 * | 2/2022 | Teranishi | H04N 25/76 |
| 2022/0050984 | A1 * | 2/2022 | Park | G06V 40/1318 |
| 2022/0084466 | A1 * | 3/2022 | Takatori | G09G 3/3233 |
| 2022/0188535 | A1 * | 6/2022 | Wang | G06V 40/1318 |
| 2022/0384401 | A1 * | 12/2022 | Bok | H01L 24/25 |
| 2023/0116805 | A1 * | 4/2023 | Kim | G09G 3/3233 345/76 |
| 2023/0301157 | A1 * | 9/2023 | Yamazaki | H05B 33/26 |
| 2023/0309364 | A1 * | 9/2023 | Yamazaki | H05B 33/04 |
| 2023/0320161 | A1 * | 10/2023 | Lee | H10K 59/80515 |
| 2023/0397885 | A1 * | 12/2023 | Kim | G06F 3/0416 |
| 2024/0142301 | A1 * | 5/2024 | Chen | H04N 25/671 |
| 2024/0250101 | A1 * | 7/2024 | Kim | G06F 3/042 |

FOREIGN PATENT DOCUMENTS

| | | | |
|---|---|---|---|
| KR | 10-2021-0050428 | A | 5/2021 |
| KR | 10-2021-0126840 | A | 10/2021 |

* cited by examiner

GAMMA REFERENCE VOLTAGE GENERATOR
400
DATA DRIVER
500
EMISSION DRIVER
600
100
EL
VGREF
VDATA
SL
DL
PX
LIGHT SENSING DRIVER
700
GL
GATE DRIVER
300
CONT4
CONT3
CONT2
DATA
CONT1
CONT5
PGGD
DRIVING CONTROLLER
200
IMG
CONT
D1
D2

PX2

OPD_PX2

SL
VOPD
T10
GW[n]
VREF
T8B
N6
TG2
VRST
T9
N5B
T12
OPD2
GR
T11
ELVSS
TG1
OPD1

EE_PX1

EM[n]
ELVDD
T5
N2
T1
N3
T6
N4
EE
ELVSS
T7
AINT
T3
CST
N1
T4
VINT
T2
GW[n]
VDATA
GC[n]
GI[n]
GB[n]

PX3
OPD_PX3
SL
T10
GW[n]
VREF
T8C
N6
VRST
T9
N5A
GR
OPD
EE_PX1
ELVDD
EM[n]
T5
N2
T1
N3
T6
N4
EE
ELVSS
T7
AINT
T3
CST
N1
T4
VINT
T2
GW[n]
VDATA
GC[n]
GI[n]
GB[n]

PX5
OPD_PX5
EE_PX1
SL
GW[n]
T10
TG2
VREF
T8E
N6
OPD2
VRST
T9
N5B
T12
T11
ELVSS
GR
OPD1
TG1
EM[n]
T5
N2
T1
N3
T6
N4
EE
ELVDD
T3
T7
AINT
CST
N1
T4
VINT
T2
GW[n]
VDATA
GC[n]
GI[n]
GB[n]

PIXEL CIRCUIT, DISPLAY DEVICE INCLUDING THE SAME AND ELECTRONIC DEVICE INCLUDING THE SAME

CROSS-REFERENCE TO RELATED APPLICATION

The present application claims priority to, and the benefit of, Korean Patent Application No. 10-2024-0073178, filed on Jun. 4, 2024, in the Korean Intellectual Property Office, the disclosure of which is incorporated herein by reference.

BACKGROUND

1. Field

Embodiments of the present disclosure relate to a pixel circuit including a photodiode and the display device and the electronic device including the same.

2. Description of the Related Art

Electronic devices (e.g., a smart phone, a smart watch, etc.) have been developed to perform bio-sensing operations (e.g., a fingerprint-sensing operation, a photoplethysmography ("PPG") sensing operation, etc.). These electronic devices may perform the bio-sensing operations using a sensor that is separate from a display device. In this case, a size of a display region of the display device may be reduced, and a size of a bezel may be increased.

Attempts have been made to solve this problem. For example, an in-cell light sensor technique has been used to employ an optical sensor or a light-sensing pixel within the display region of the display device.

SUMMARY

Embodiments of the present disclosure provide a pixel circuit for improving an accuracy of biomarkers by changing a photodiode voltage applied to light-sensing driver.

Embodiments of the present disclosure also provide a display device for improving an accuracy of biomarkers by changing a photodiode voltage applied to light-sensing driver.

Embodiments of the present disclosure also provide an electronic device for improving an accuracy of biomarkers by changing a photodiode voltage applied to light-sensing driver.

According to embodiments, a pixel circuit may include a light emitter configured to emit light, and including an emission driving transistor configured to output a driving current based on a data voltage, a write transistor configured to apply the data voltage to the emission driving transistor in response to a write gate signal, and a light-emitting element configured to emit light based on the driving current, and a light sensor configured to sense the light of the light emitter, and including a sensing driving transistor including a first control electrode for receiving a reset voltage and a sensing voltage, and a second control electrode for receiving an adjustable photodiode voltage, and configured to generate a sensing current in response to the sensing voltage, a sensing initialization transistor configured to apply the reset voltage to the first control electrode of the sensing driving transistor in response to a photo initialization gate signal, and a sensing output transistor configured to apply the sensing current to a sensing line in response to an output gate signal.

The photodiode voltage may be configured to be changed based on a sensing code corresponding to the sensing current.

The photodiode voltage may be configured to have a voltage level that is lower than a reference photodiode voltage when a number of the sensing code is lower than a number of an initial sensing code.

The initial sensing code may be configured to be set in a manufacturing process.

The reference photodiode voltage may be configured to be set based on an initial threshold voltage of the sensing driving transistor and the initial sensing code.

The sensing current may be based on the sensing voltage and the photodiode voltage.

The light emitter may further include a light-emitting element initialization transistor configured to apply a light-emitting element initialization voltage to a first electrode of the light-emitting element, wherein a first electrode of the sensing driving transistor is configured to receive the light-emitting element initialization voltage.

The output gate signal may include the write gate signal.

The light sensor may include a photodiode including a first sub-photodiode configured to generate a first sensing voltage, and a second sub-photodiode configured to generate a second sensing voltage, wherein the light sensor further includes a first transfer transistor configured to apply the first sensing voltage to the first control electrode of the sensing driving transistor in response to a first transfer signal, and a second transfer transistor configured to apply the second sensing voltage to the first control electrode of the sensing driving transistor in response to a second transfer signal that is different from the first transfer signal.

According to embodiments, a pixel circuit may include a light emitter, and a light sensor including a photodiode, a sensing driving transistor including a first control electrode connected to a fifth node, a second control electrode for receiving a photodiode voltage, a first electrode for receiving a reference voltage, and a second electrode connected to a sixth node, a sensing initialization transistor including a control electrode for receiving a photo initialization gate signal, a first electrode for receiving a reset voltage, and a second electrode connected to the fifth node, and a sensing output transistor including a control electrode for receiving a write gate signal, a first electrode connected to the sixth node, and a second electrode connected to a sensing line.

The photodiode may include a first electrode connected to the fifth node, and a second electrode for receiving a second power voltage.

The light emitter may include a first transistor including a control electrode connected to a first node, a first electrode connected to a second node, and a second electrode connected to a third node, a second transistor including a control electrode for receiving the write gate signal, a first electrode for receiving a data voltage, and a second electrode connected to the second node, a third transistor including a control electrode for receiving a compensation gate signal, a first electrode connected to the third node, and a second electrode connected to the first node, a fourth transistor including a control electrode for receiving an initialization gate signal, a first electrode for receiving an initialization voltage, and a second electrode connected to the first node, a fifth transistor including a control electrode for receiving an emission signal, a first electrode for receiving a first power voltage, and a second electrode connected to the second node, a sixth transistor including a control electrode for receiving the emission signal, a first electrode connected to the third node, and a second electrode connected to a fourth node, a seventh transistor including a control electrode for receiving a light-emitting element initialization gate signal, a first electrode for receiving a light-emitting element initialization voltage, and a second electrode connected to the fourth node, and a light-emitting element including a first electrode connected to the fourth node, and a second electrode for receiving a second power voltage, and wherein the reference voltage includes the light-emitting element initialization voltage.

The photodiode voltage may include the first power voltage.

The write gate signal may be configured to swing between a high voltage, and a low voltage that is lower than the high voltage, wherein the photodiode voltage includes the low voltage.

The photodiode may include a first sub-photodiode and a second sub-photodiode, wherein the light sensor further includes a first transfer transistor including a control electrode for receiving a first transfer signal, a first electrode connected to the fifth node, and a second electrode connected to the first sub-photodiode, and a second transfer transistor including a control electrode for receiving a second transfer signal different from the first transfer signal, a first electrode connected to the fifth node, and a second electrode connected to the second sub-photodiode.

According to embodiments, a display device may include a display panel including a pixel circuit, a gate driver configured to apply a gate signal to the display panel, a data driver configured to apply a data voltage to the display panel, an emission driver configured to apply an emission signal to the display panel, and a driving controller configured to control the gate driver, the data driver, and the emission driver, wherein the pixel circuit includes a light emitter configured to emit light, and including an emission driving transistor configured to output a driving current based on the data voltage, a write transistor configured to apply the data voltage to the emission driving transistor in response to a write gate signal, and a light-emitting element configured to emit light based on the driving current, and a light sensor configured to sense the light of the light emitter, and including a sensing driving transistor including a first control electrode for receiving a reset voltage and a sensing voltage, and a second control electrode for receiving an adjustable photodiode voltage, and configured to generate a sensing current in response to the sensing voltage, a sensing initialization transistor configured to apply the reset voltage to the first control electrode of the sensing driving transistor in response to a photo initialization gate signal, and a sensing output transistor configured to apply the sensing current to a sensing line in response to an output gate signal.

The photodiode voltage may be configured to be changed based on a sensing code corresponding to the sensing current, wherein the photodiode voltage is configured to have a voltage level that is lower than a reference photodiode voltage when a number of the sensing code is lower than a number of an initial sensing code.

The reference photodiode voltage may be configured to be set based on an initial threshold voltage of the sensing driving transistor and the initial sensing code.

The sensing current may be configured to be generated based on the sensing voltage and the photodiode voltage.

The sensing initialization transistor may include a control electrode for receiving the photo initialization gate signal, a first electrode for receiving the reset voltage, and a second electrode connected to a fifth node, wherein the sensing driving transistor includes the first control electrode connected to the fifth node, a first electrode for receiving a reference voltage, and a second electrode connected to a sixth node, and wherein the sensing output transistor includes a control electrode for receiving the write gate signal, a first electrode connected to the sixth node, and a second electrode connected to the sensing line.

According to embodiments, an electronic device may include a display panel including a pixel circuit, a gate driver configured to apply a gate signal to the display panel, a data driver configured to apply a data voltage to the display panel, an emission driver configured to apply an emission signal to the display panel, and a driving controller configured to control the gate driver, the data driver, and the emission driver, wherein the pixel circuit includes a light emitter configured to emit light, and including an emission driving transistor configured to output a driving current based on the data voltage, a write transistor configured to apply the data voltage to the emission driving transistor in response to a write gate signal, and a light-emitting element configured to emit light based on the driving current, and a light sensor configured to sense the light of the light emitter, and including a sensing driving transistor including a first control electrode for receiving a reset voltage and a sensing voltage, and a second control electrode for receiving an adjustable photodiode voltage, and configured to generate a sensing current in response to the sensing voltage, a sensing initialization transistor configured to apply the reset voltage to the first control electrode of the sensing driving transistor in response to a photo initialization gate signal, and a sensing output transistor configured to apply the sensing current to a sensing line in response to an output gate signal.

As described above, the pixel circuit may include the light emitter and the light sensor. The light sensor may include the sensing driving transistor. The photodiode voltage may be applied to the second control electrode of the sensing driving transistor. The photodiode voltage may be changed. A range of a sensing current outputted from the sensing driving transistor may be changed according to a usage environment of the display device. The photodiode voltage may be changed, so that the sensing driving transistor may output a sensing current corresponding to an initial sensing current range by compensating a range of the changed sensing current. Accordingly, an accuracy of a biomarker based on the sensing current may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
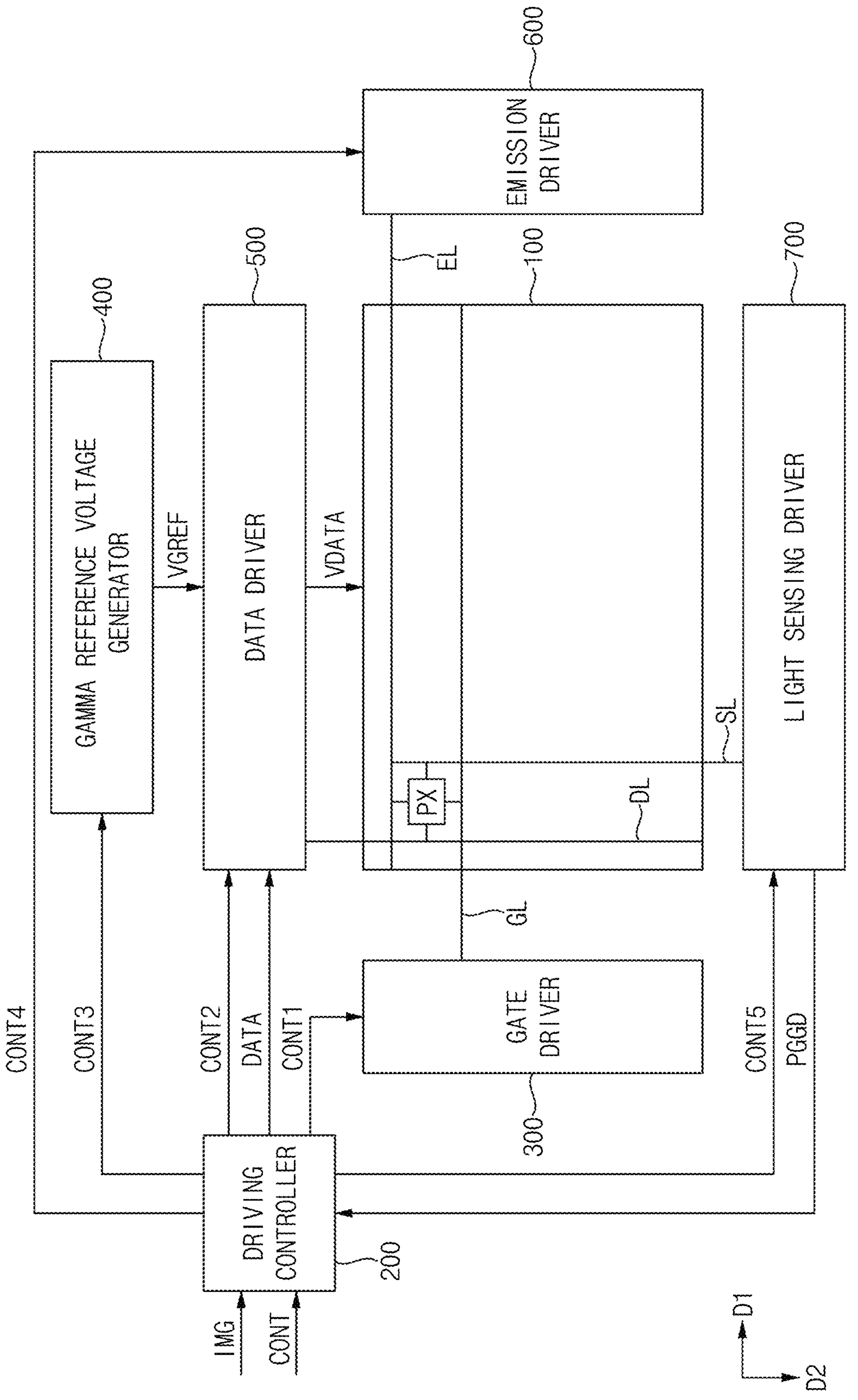
FIG. 1 is a block diagram illustrating a display device according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to embodiments of the present disclosure.

Referring to FIG. 1, the display device may include a display panel 100 including a plurality of pixel circuits PX, and a display panel driver for driving the display panel 100. In one or more embodiments, the display panel driver includes a gate driver 300 connected to the pixel circuits PX through gate lines GL, a data driver 500 connected to the pixel circuits PX through data lines DL, an emission driver 600 connected to the pixel circuits PX through emission lines EL, a light-sensing driver 700 connected to the pixel circuits PX through sensing lines SL, and a driving controller 200 that controls the gate driver 300, the data driver 500, the emission driver 600, and the light-sensing driver 700.

The display panel 100 may include the gate lines GL, the data lines DL, the emission lines EL, the sensing lines SL, and a plurality of pixel circuit PX electrically connected to the gate lines GL, the data lines DL, the emission lines EL, and the sensing lines SL. For example, the display panel 100 may be an organic light-emitting diode (OLED) display panel, a quantum dot (QD) display panel, and etc. However, the present disclosure is not limited thereto.

The gate lines GL may extend in a first direction D1. The sensing lines SL may extend in a second direction D2 different from the first direction D1. For example, the first direction D1 may be a direction substantially perpendicular to the second direction D2.

The display device may include the display panel 10, the driving controller 200, the gate driver 300, the gamma reference voltage generator 400, the data driver 500, the emission driver 600, and the light-sensing driver 700. In one or more embodiments, the driving controller 200 and the data driver 500 may be integrated into one chip.

The pixel circuit PX may include a light emitter and a light sensor. The light emitter may include a light-emitting element. The light sensor may include a photodiode. For example, the photodiode may be an organic photodiode.

The display panel 100 may include a display region displaying an image and a peripheral region located adjacent to the display region. In one or more embodiments, the gate driver 300 may be mounted in the peripheral region. In one or more embodiments, the gate driver 300 may be integrated into the peripheral region.

The display panel 100 may include the gate lines GL, the data lines DL, the emission lines EL, the sensing lines SL, and a plurality of pixel circuit PX electrically connected to the gate lines GL, the data lines DL, the emission lines EL, and the sensing lines SL. The gate lines GL and the data lines DL may extend in directions intersecting each other.

The driving controller 200 may receive input image data IMG and an input control signal CONT from a host processor (e.g., an application processor) and/or a graphic processing unit (GPU). For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, a fifth control signal CONT5, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a scan clock signal.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the fourth control signal CONT4 for controlling an operation of the emission driver 600 based on the input control signal CONT, and may output the fourth control signal CONT4 to the emission driver 600.

The driving controller 200 may generate the fifth control signal CONT5 based on the input control signal CONT. The driving controller 200 may output the fifth control signal CONT5 to the light-sensing driver 700.

The gate driver 300 may generate gate signals driving the gate lines GL in response to the first control signal CONT1 received from the driving controller 200. The gate driver 300 may output the gate signals to the gate lines GL. The gate signal may include a write gate signal GW[n] of FIG. 2, a compensation gate signal GC[n] of FIG. 2, an initialization gate signal GI[n] of FIG. 2, a light-emitting element initialization signal GB[n] of FIG. 2, a photo initialization gate signal GR of FIG. 2, and an output gate signal. In one or more embodiments, the photo initialization gate signal GR of FIG. 2 may be a global signal that is concurrently or substantially simultaneously applied to the pixel circuits PX. For example, the write gate signal GW[n] may swing between a high voltage and a low voltage VGL of FIG. 6.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA. For example, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL.

In one or more embodiments, the data driver 500 may be implemented with one or more integrated circuits. In one or more other embodiments, the data driver 500 and the driving controller 200 may be implemented as a single integrated circuit, and the single integrated circuit may be called a timing controller embedded data driver (TED).

The emission driver 600 may generate an emission signal driving the emission lines EL in response to the fourth control signal CONT4 received from the driving controller 200. The emission driver 600 may output the emission signal to the display panel 100.

In one or more embodiments, the emission driver 600 may be located in the peripheral region. In one or more embodiments, the emission driver 600 may be integrated in the peripheral region.

Although the gate driver 300 is located on a first side of the display panel 100, and the emission driver 600 is located on a second side of the display panel 100 in FIG. 1 for convenience of explanation, the present disclosure is not limited thereto. The gate driver 300 and the emission driver 600 may be located on the first side of the display panel 100. For example, the gate driver 300 and the emission driver 600 may be located on the peripheral region of the display panel 100 on the same side of the display region of the display panel 100. For example, the gate driver 300 and the emission driver 600 may be formed integrally with each other.

The light-sensing driver 700 may receive the fifth control signal CONT5 from the driving controller 200. The light-sensing driver 700 may sense the pixel circuits PX through the sensing lines SL, and may receive a sensing current. In one or more embodiments, the light-sensing driver 700 may may be implemented as a separate integrated circuit from the integrated circuit of the data driver 500. In one or more other embodiments, the light-sensing driver 700 may be included in the data driver 500 or may be included in the driving controller 200.

The display panel driver may perform a photoplethysmography (PPG) sensing operation to the display panel 100. The PPG sensing operation may be performed such that the light emitter may emit light, and the light sensor may sense the light reflected from a blood vessel of the finger of the user. For example, when a heart of the user contracts and a volume of the blood vessel increases, the number of hemoglobin in the blood vessel may increase, a light intensity absorbed by the hemoglobin may increase, and the light sensor may measure a relatively low light intensity of reflected light. In contrast, when the heart of the user expands (or relaxes) and the volume of the blood vessel decreases, the number of hemoglobin in the blood vessel may decrease, the light intensity absorbed by the hemoglobin may decrease, and the light sensor may measure a relatively high light intensity of the reflected light. The light-sensing driver 700 may generate a light-sensing data PGGD indicating the volume of the blood vessel based on the light intensity measured by the light sensor. In one or more embodiments, the pixel PX may output the sensing current for the light-sensing driver 700 for generating the light-sensing data PGGD.

A sensing code corresponding to the sensing current may be generated. For example, the sensing code may be a code corresponding to a value of the sensing current. For example, an initial sensing code may be set in a manufacturing process. The initial sensing code may be changed by a setter.

Based on the light-sensing data PGGD generated from the light-sensing driver 700, a biomarker may be generated.

Figure 2:
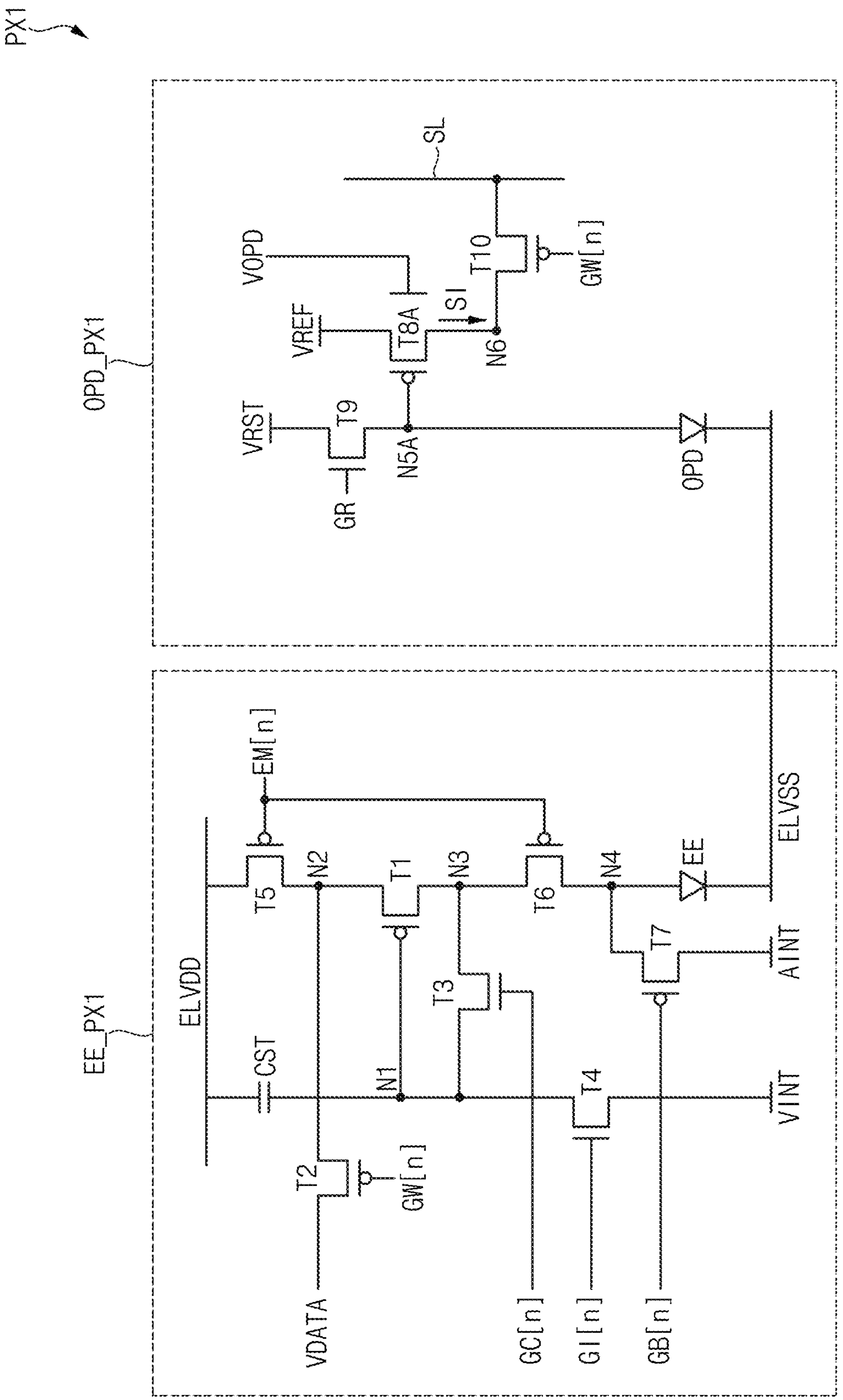
FIG. 2 is a circuit diagram illustrating an example of a pixel circuit of FIG. 1.
Figure 3:
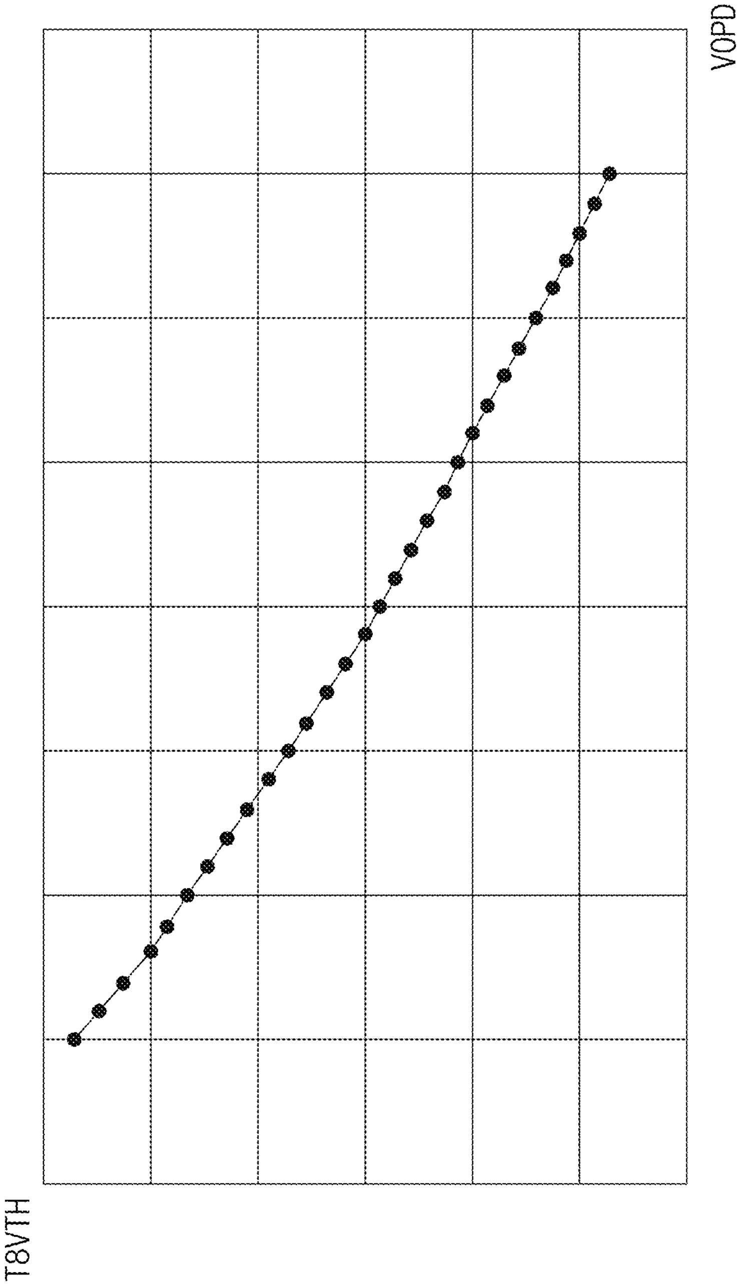
FIG. 3 is a graph illustrating correlation between a photodiode voltage applied to a pixel circuit and a threshold voltage of a sensing driving transistor.
Figure 4:
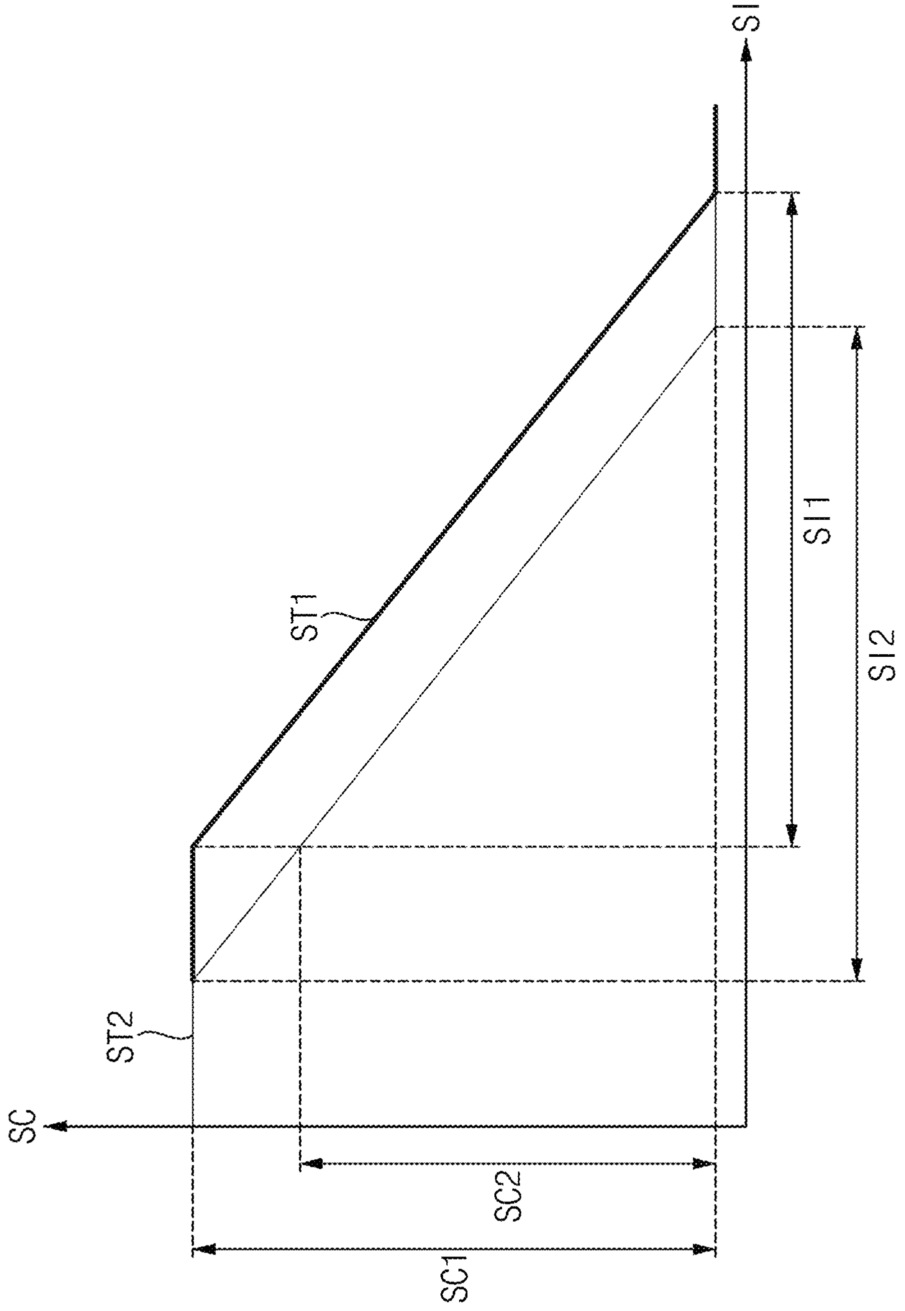
FIG. 4 is a graph illustrating a sensing code in a first state and a second state of a display device of FIG. 1.

FIG. 2 is a circuit diagram illustrating an example of a pixel circuit PX of FIG. 1. FIG. 3 is a graph illustrating correlation between a photodiode voltage VOPD applied to a pixel circuit PX1 and a threshold voltage of a sensing driving transistor. FIG. 4 is a graph illustrating a sensing code SC in a first state ST1 and a second state ST2 of a display device of FIG. 1.

Referring to FIG. 1 to FIG. 4, a pixel circuit PX1 may include the light emitter EE_PX1 and the light sensor OPD_PX1. The light emitter EE_PX1 may include a first transistor T1, a second transistor T2, a third transistor T3, a fourth transistor T4, a fifth transistor T5, a sixth transistor T6, a seventh transistor T7, a storage capacitor CST, and the light-emitting element EE. The light sensor OPD_PX1 may include an eighth transistor T8A, a ninth transistor T9, a tenth transistor T10, and the photodiode OPD.

The first transistor T1 may include a control electrode connected to a first node N1, a first electrode connected to a second node N2, and a second electrode connected to a third node N3. The first transistor T1 may output a driving current based on the data voltage VDATA. For example, the first transistor T1 may be called as an emission driving transistor.

The second transistor T2 may include a control electrode for receiving the write gate signal GW[n], a first electrode for receiving the data voltage VDATA, and a second electrode connected to the second node N2. The second transistor T2 may apply the data voltage VDATA to the first transistor T1 in response to the write gate signal GW[n]. For example, the second transistor T2 may be called as a write transistor.

The third transistor T3 may include a control electrode for receiving the compensation gate signal GC[n], a first electrode connected to the third node N3, and a second electrode connected to the first node N1. The third transistor T3 may diode-connect the first transistor T1 in response to the compensation gate signal GC[n].

The fourth transistor T4 may include a control electrode for receiving the initialization gate signal GI[n], a first electrode for receiving an initialization voltage VINT, and a second electrode connected to the first node N1. The fourth transistor T4 may apply the initialization voltage VINT to the first node N1 in response to the initialization gate signal GI[n]. A voltage of the first node N1 may be initialized as the initialization voltage VINT.

The fifth transistor T5 may include a control electrode for receiving the emission signal EM[n], a first electrode for receiving a first power voltage ELVDD, and a second electrode connected to the second node N2. The fifth transistor T5 may apply the first power voltage ELVDD to the second node N2 in response to the emission signal EM[n].

The sixth transistor T6 may include a control electrode for receiving the emission signal EM[n], a first electrode connected to the third node N3, and a second electrode connected to a fourth node N4. The sixth transistor T6 may apply the driving current to the light-emitting element EE in response to the emission signal EM[n].

The seventh transistor T7 may include a control electrode for receiving the light-emitting element initialization gate signal GB[n], a first electrode for receiving a light-emitting element initialization voltage AINT, and a second electrode connected to the fourth node N4. The seventh transistor T7 may apply the light-emitting element initialization voltage AINT to the fourth node N4 in response to the light-emitting element initialization gate signal GB[n].

The light-emitting element EE may include a first electrode connected to the fourth node N4, and a second electrode for receiving a second power voltage ELVSS. The light-emitting element EE may emit light based on the driving current. In one or more embodiments, the light-emitting element EE may be an organic light-emitting diode ("OLED"), a nano light-emitting diode ("NED"), a quantum dot ("QD") light-emitting diode, a micro light-emitting diode, an inorganic light-emitting diode, or any other suitable light-emitting element.

In one or more embodiments, as shown in FIG. 2, the first, the second, the fifth, the sixth, and the seventh transistors T1, T2, T5, T6, and T7 may be P-type transistors, and the third and the fourth transistors T3 and T4 may be N-type transistors. However, the present disclosure is not limited to a type of the transistors. Additionally, the present disclosure is not limited to a structure of the light emitter EE_PX1 of the pixel circuit PX1.

The eighth transistor T8A may include a first control electrode connected to a fifth node N5A, a second control electrode for receiving the photodiode voltage VOPD, a first electrode for receiving a reference voltage VREF, and a second electrode connected to a sixth node N6. The eighth transistor T8A may output a sensing current SI based on a voltage of the fifth node N5A and the photodiode voltage VOPD. For example, the eighth transistor T8A may be called as a sensing driving transistor. In one or more embodiments, the reference voltage VREF may be the light-emitting element initialization voltage AINT. In one or more embodiments, the reference voltage VREF may be the initialization voltage VINT.

The photodiode voltage VOPD may be changed. The photodiode voltage VOPD may be a power voltage. For example, the photodiode voltage VOPD may be DC voltage. The photodiode voltage VOPD may be changed based on the sensing current SI. For example, a difference may be determined by comparing the sensing code and the initial sensing code. The photodiode voltage VOPD may be changed based on the difference. For example, when a number of the sensing code is lower than a number of the initial sensing code, the photodiode voltage VOPD may have a voltage level that is lower than a reference photodiode voltage.

The reference photodiode voltage may have a voltage level corresponding to the initial sensing code. The reference photodiode voltage may be set to have a number of the initial sensing codes by reflecting the characteristics of the display device (e.g., threshold voltage/mobility of the eighth transistor T8A) in the manufacturing process.

For example, when the number of the initial sensing code is about 60000 and the number of the sensing code is about 50000, the photodiode voltage VOPD may be changed to a voltage level that is lower than the reference photodiode voltage.

For example, as shown in FIG. 3, when the photodiode voltage VOPD is decreased, an eighth threshold voltage T8VTH that is a threshold voltage of the eighth transistor T8 may be increased. A range of the sensing current SI that the eighth transistor T8 may output may be changed based on the eighth threshold voltage T8VTH.

For example, a first sensing code SC1 corresponding to a first sensing current range SI1 in the first state ST1 may be generated. The first sensing code SC1 may correspond to the initial sensing code. The display device bay be changed from the first state ST1 to the second state ST2 according to a usage environment (e.g., usage time, temperature, etc.) of the display device. In the second state ST2, the threshold voltage T8VTH of the eighth transistor T8A may be changed based on the usage environment. In the second state ST2, according to change of the eighth threshold voltage T8VTH, the eighth transistor T8 may output the sensing current SI corresponding a second sensing current range SI2. The sensing code SC corresponding to the second sensing current range SI2 may be a second sensing code SC2. A number of the second sensing code SC2 may be lower than the number of the first sensing code SC1. Accordingly, an accuracy of the biomarker may be deteriorated.

The display device according to the present disclosure may change the photodiode voltage VOPD. Accordingly, in the second state ST2, the first sensing the photodiode voltage VOPD may be varied so as to have the number of the first sensing codes SC1. For example, the light-sensing driver 700 may determine a difference between the first sensing code SC1 and the second sensing code SC2. By determining the difference, when the number of the second sensing code SC2 is lower than the number of the first sensing code SC1, the photodiode voltage VOPD may be decreased. When the photodiode voltage VOPD is decreased, the eighth threshold voltage T8VTH may be increased. When the eighth threshold voltage T8VTH is increased, the eighth transistor T8 may output the sensing current SI corresponding to the first sensing current range SI1. Accordingly, an accuracy of the biomarker may be improved.

The ninth transistor T9 may include a control electrode for receiving the photo initialization gate signal GR, a first electrode for receiving a reset voltage VRST, and a second electrode connected to the fifth node NSA. The ninth transistor T9 may apply the reset voltage VRST to the fifth node N5A in response to the photo initialization gate signal GR. For example, a voltage of the ninth node N5A may be initialized as the reset voltage VRST. For example, the ninth transistor T9 may be called as a sensing initialization transistor.

The tenth transistor T10 may include a control electrode for receiving the output gate signal, a first electrode connected to the sixth node N6, and a second electrode connected to the sensing line SL. For example, the tenth transistor T10 may output the sensing current SI to the sensing line SL in response to the output gate signal. In one or more embodiments, the output gate signal may be the write gate signal GW[n]. For example, the tenth transistor T10 may output the sensing current SI in response to the sensing line SL in response to the write gate signal GW[n].

The photodiode OPD may include a first electrode connected to the fifth node NSA, and a second electrode for receiving the second power voltage ELVSS. The photodiode OPD may be used to measure a light intensity. For example, after a voltage of the first electrode of the photodiode OPD may reset as the reset voltage VRST, the voltage of the first electrode of the photodiode OPD may be changed according to the light intensity. For example, the photodiode OPD may output a sensing voltage corresponding to the light intensity to the fifth node N5A. The sensing current of the ninth transistor T9 may be determined by a voltage of the fifth node N5A and the photodiode voltage VOPD.

Figure 5:
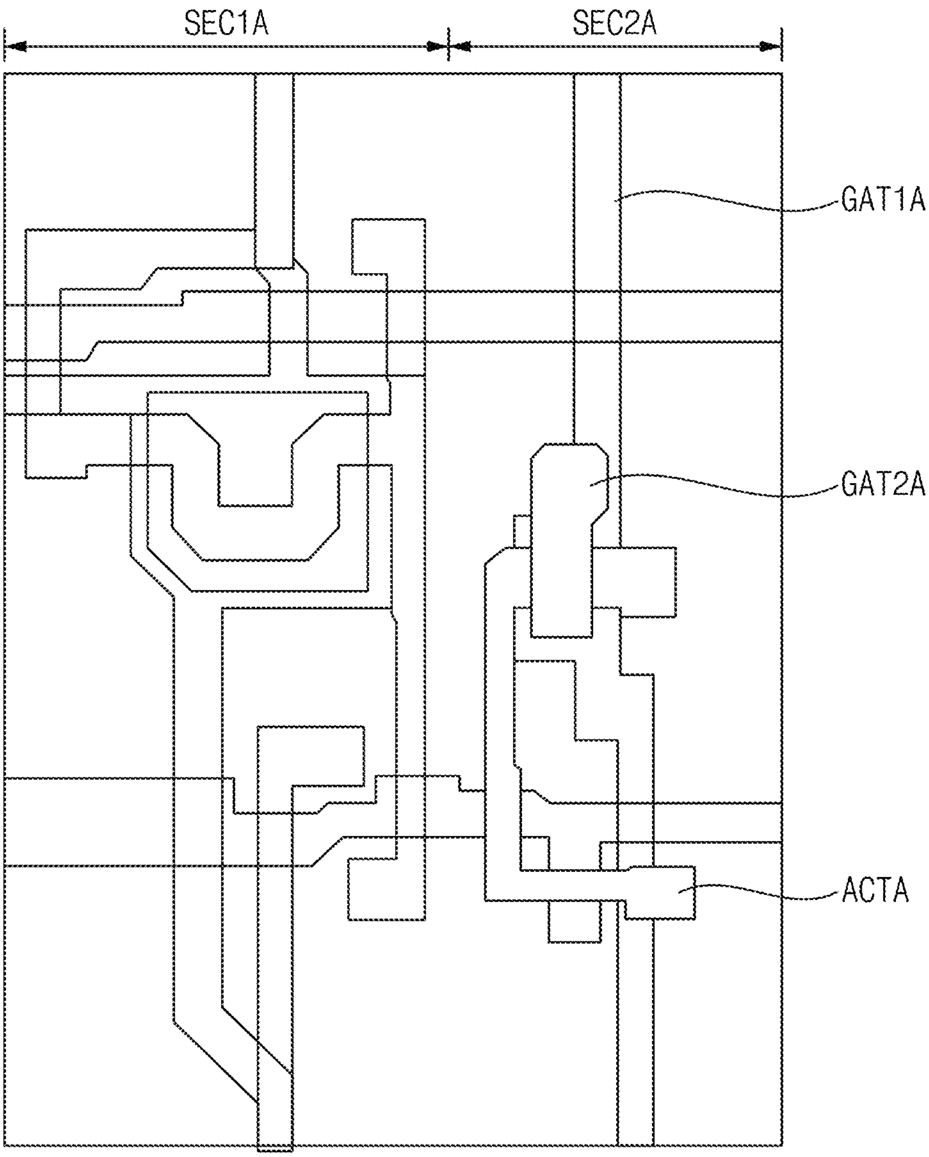
FIG. 5 is a plan view of an example of some of the pixel circuit of FIG. 2.

FIG. 5 is a plan view of an example of some of the pixel circuit of FIG. 2. The phrase "in a plan view" means when an object portion is viewed from above.

The display device may include the light emitter EE_PX1, and the light sensor OPD_PX1 that is adjacent to the light emitter EE_PX1. For example, a first section SEC1A of FIG. 5 may be some of the light emitter EE_PX1, and the second section SEC2A may be the eighth transistor T8A of the light sensor OPD_PX1.

Referring to FIG. 2 and FIG. 5, the second section SEC2A may include a first gate pattern GAT1A, an active pattern ACTA, and a second gate pattern GAT2A.

The first gate pattern GAT1A may form the second control electrode of the eighth transistor T8A. For example, the first gate pattern GAT1A may form a photodiode voltage line. The photodiode voltage line may receive the photodiode voltage VOPD.

The active pattern ACTA may be located on the first gate pattern GAT1A (as used herein "located on" may mean "above"). The active pattern ACTA may form the eighth transistor T8A.

The second gate pattern GAT2A may be located on the active pattern ACTA. The second gate pattern GAT2A may form the first control electrode of the eighth transistor T8A.

The eighth transistor T8A may include the first control electrode and the second control electrode. For example, the eighth transistor T8A may have a double-gate structure. The photodiode voltage VOPD may be applied to the second control electrode of eighth transistor T8A. The photodiode voltage VOPD may be changed based on the sensing current, so that an accuracy of the sensing current may be improved.

Figure 6:
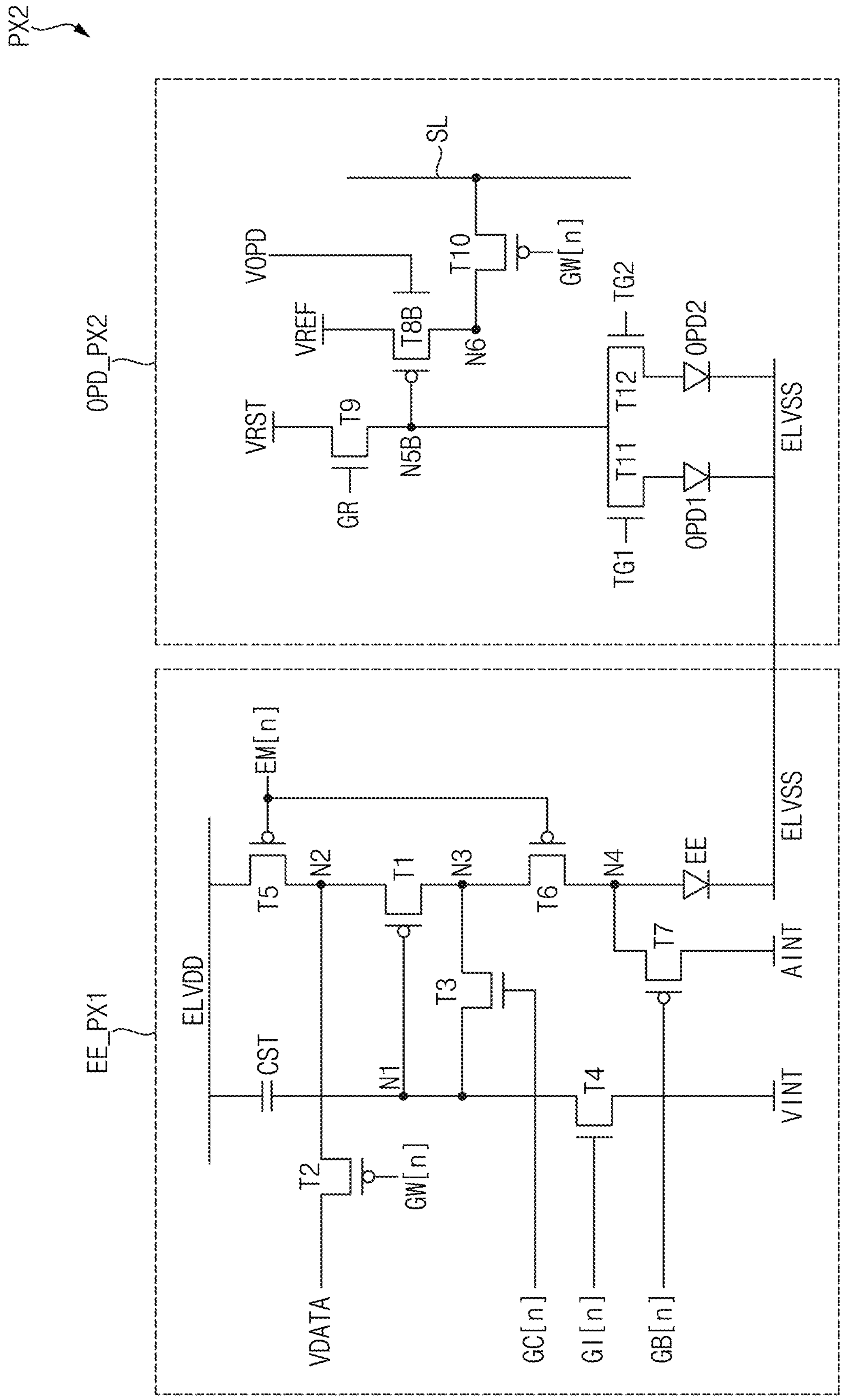
FIG. 6 is a circuit diagram illustrating an example of a pixel circuit of FIG. 1.

FIG. 6 is a circuit diagram illustrating an example of a pixel circuit PX of FIG. 1.

Referring to FIG. 2 and FIG. 6, a pixel circuit PX2 may include the light emitter EE_PX1 and a light sensor OPD_PX2. The light sensor OPD_PX2 may include an eighth transistor T8B, the ninth transistor T9, the tenth transistor T10, an eleventh transistor T11, a twelfth transistor T12, a first sub-photodiode OPD1, and a second sub-photodiode OPD2.

The pixel circuit PX2 may be substantially the same as the pixel circuit PX1 of FIG. 2, except that the pixel circuit PX2 may include the eleventh transistor T11, the twelfth transistor T12, the first sub-photodiode OPD1, and the second sub-photodiode OPD2. Accordingly, the same reference numerals will be used, and any repetitive explanation concerning the above elements will be omitted.

The eleventh transistor T11 may include a control electrode for receiving a first transfer signal TG1, a first electrode connected to a fifth node N5B, and a second electrode connected to the first sub-photodiode OPD1. For example, the eleventh transistor T11 may be called as a first transfer transistor.

The twelfth transistor T12 may include a control electrode for receiving a second transfer signal TG2, a first electrode connected to the fifth node N5B, and a second electrode connected to the second sub-photodiode OPD2. For example, the twelfth transistor T12 may be called as a second transfer transistor.

The eleventh transistor T11 may connect a first electrode of the first sub-photodiode OPD1 and the fifth node N5B in response to the first transfer signal TG1. The twelfth transistor T12 may connect a first electrode of the second sub-photodiode OPD2 and the fifth node N5B in response to the second transfer signal TG2. When the first transfer signal TG1 has an activation level (e.g., high level), the first electrode of the first sub-photodiode OPD1 may be connected to the fifth node N5B, and a first sensing current corresponding to a light intensity applied to the first sub-photodiode OPD1 may be outputted through the sensing line SL. Additionally, when the second transfer signal TG2 has an activation level (e.g., high level), the first electrode of the second sub-photodiode OPD2 may be connected to the fifth node N5B, and a second sensing current corresponding to a light intensity applied to the second sub-photodiode OPD2 may be outputted through the sensing line SL.

The first sub-photodiode OPD1 may include the first electrode connected to the second electrode of the eleventh transistor T11, and a second electrode for receiving the second power voltage ELVSS. The second sub-photodiode OPD2 may include the first electrode connected to the second electrode of the twelfth transistor T12, and a second electrode for receiving the second power voltage ELVSS.

The first and second photodiodes OPD1 and OPD2 may be used to measure a light intensity. For example, when the first electrode of the first sub-photodiode OPD1 is connected to the fifth node N5B, a voltage of the first electrode of the first sub-photodiode OPD1 may reset as the reset voltage VRST, and then the voltage of the first electrode of the first sub-photodiode OPD1 may be changed according to the light intensity, and the eighth transistor T8B may output the first sensing current. Additionally, when the first electrode of the second sub-photodiode OPD2 is connected to the fifth node N5B, a voltage of the first electrode of the second sub-photodiode OPD2 may reset as the reset voltage VRST, and then the voltage of the first electrode of the second sub-photodiode OPD2 may be changed according to the light intensity, and the eighth transistor T8B may output the second sensing current.

Accordingly, the first and second sub-photodiodes OPD1 and OPD2 may be driven by relatively few transistors, so that a resolution of the display panel may be improved.

Additionally, the photodiode voltage VOPD may be changed, so that an accuracy of the sensing current may be improved. An accuracy of the sensing current may be improved, so that a precision of the biomarker may be improved. Additionally, the sensing voltage generated from the photodiode OPD may be reflected more precisely. For example, when a voltage level of the sensing voltage is increased, the sensing current corresponding to the sensing voltage that is a high voltage level may be generated. The photodiode voltage VOPD may be changed, the display device may have a number of sensing codes similar to the number of initial sensing codes even when the usage environment changes. Accordingly, the precision of the biomarker may be further improved.

Figure 7:
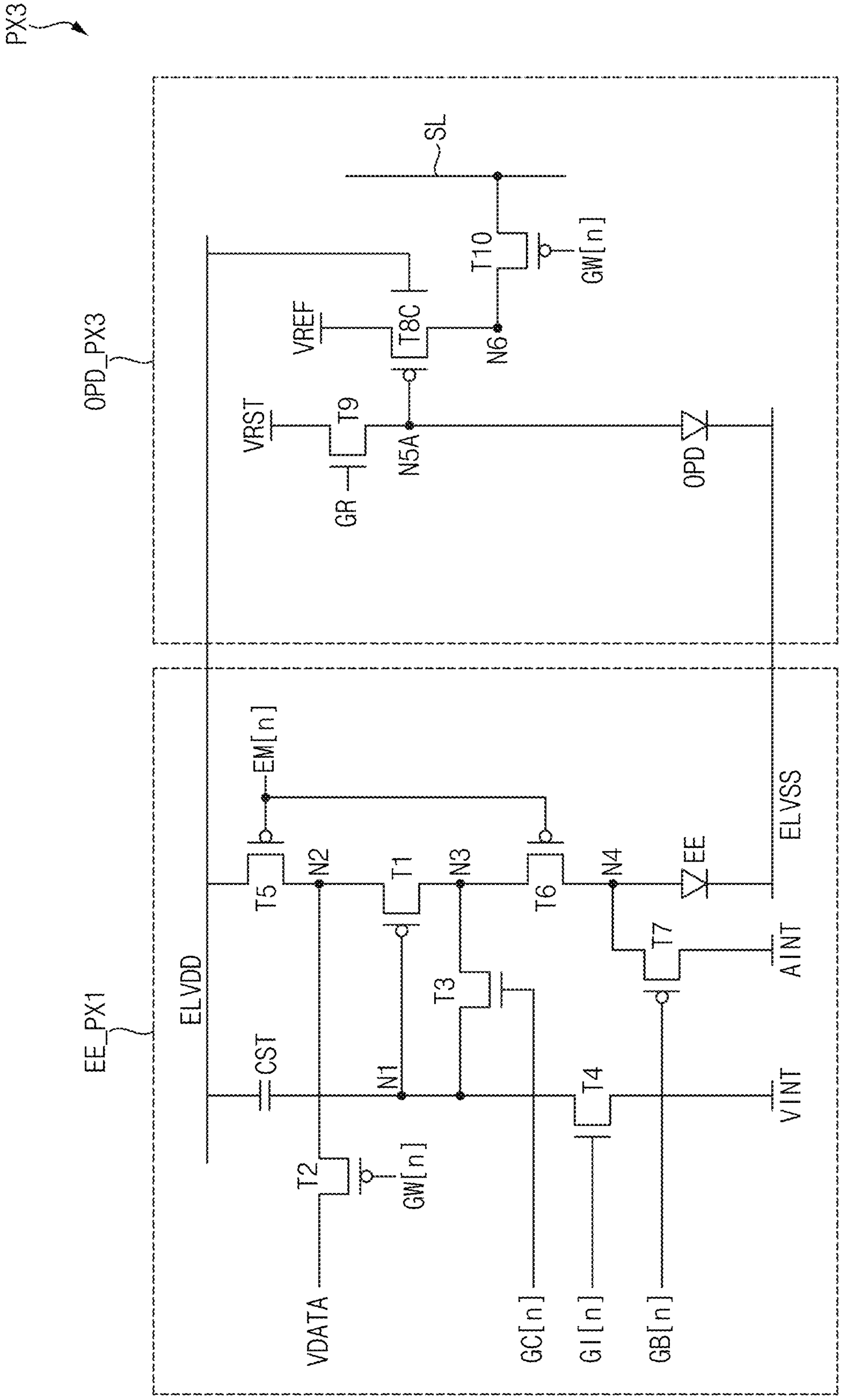
FIG. 7 is a circuit diagram illustrating an example of a pixel circuit of FIG. 1.

FIG. 7 is a circuit diagram illustrating an example of a pixel circuit PX of FIG. 1.

A pixel circuit PX3 may include the light emitter EE_PX1 and a light sensor OPD_PX3. The pixel circuit PX3 may be substantially the same as the pixel circuit PX1 of FIG. 2, except that the first power voltage ELVDD may be applied to a second control electrode of an eighth transistor T8C included in the light sensor OPD_PX3. Accordingly, the same reference numerals will be used and any repetitive explanation concerning the above elements will be omitted.

Referring to FIG. 7, the eighth transistor T8C may include a first control electrode connected to the fifth node NSA, a second control electrode for receiving the first power voltage ELVDD, a first electrode for receiving the reference voltage VREF, and a second electrode connected to the sixth node N6. The eighth transistor T8C may output the sensing current based on a voltage of the fifth node N5A and the first power voltage ELVDD. The first power voltage ELVDD may be applied to the second control electrode of the eighth transistor T8C, so that a stability and a reliability of the pixel circuit PX3 may be improved. Accordingly, an accuracy of the sensing current may be improved. An accuracy of the sensing current may be improved, so that an accuracy of the biomarker may be improved.

Figure 8:
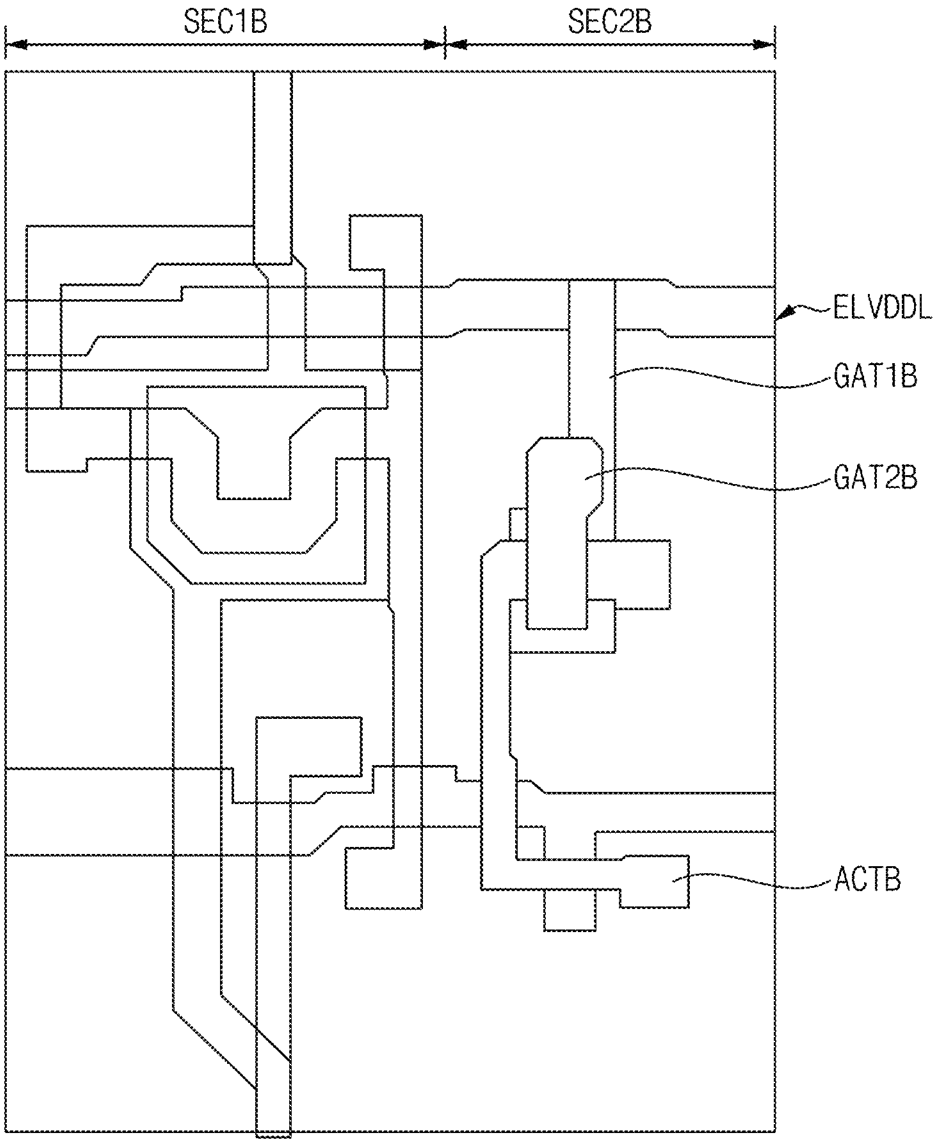
FIG. 8 is a plan view of an example of some of the pixel circuit of FIG. 7.

FIG. 8 is a plan view of an example of some of the pixel circuit PX3 of FIG. 7.

The display device may include the light emitter EE_PX1, and the light sensor OPD_PX3 that is adjacent to the light emitter EE_PX1. For example, a first section SEC1B of FIG. 8 may be some of the light emitter EE_PX1, and the second section SEC2B may be the eighth transistor T8C of the light sensor OPD_PX3.

Referring to FIG. 7 and FIG. 8, the second section SEC2B may include a first gate pattern GAT1B, an active pattern ACTB, and a second gate pattern GAT2B.

The first gate pattern GAT1B may form the second control electrode of the eighth transistor T8B. For example, the first gate pattern GAT1B may be located on a first power voltage line ELVDDL. The first power voltage line ELVDDL may receive the first power voltage ELVDD.

The active pattern ACTB may be located on the first gate pattern GAT1B. The active pattern ACTB may form the eighth transistor T8C.

The second gate pattern GAT2B may be located on the active pattern ACTB. The second gate pattern GAT2B may form the first control electrode of the eighth transistor T8C.

Figure 9:
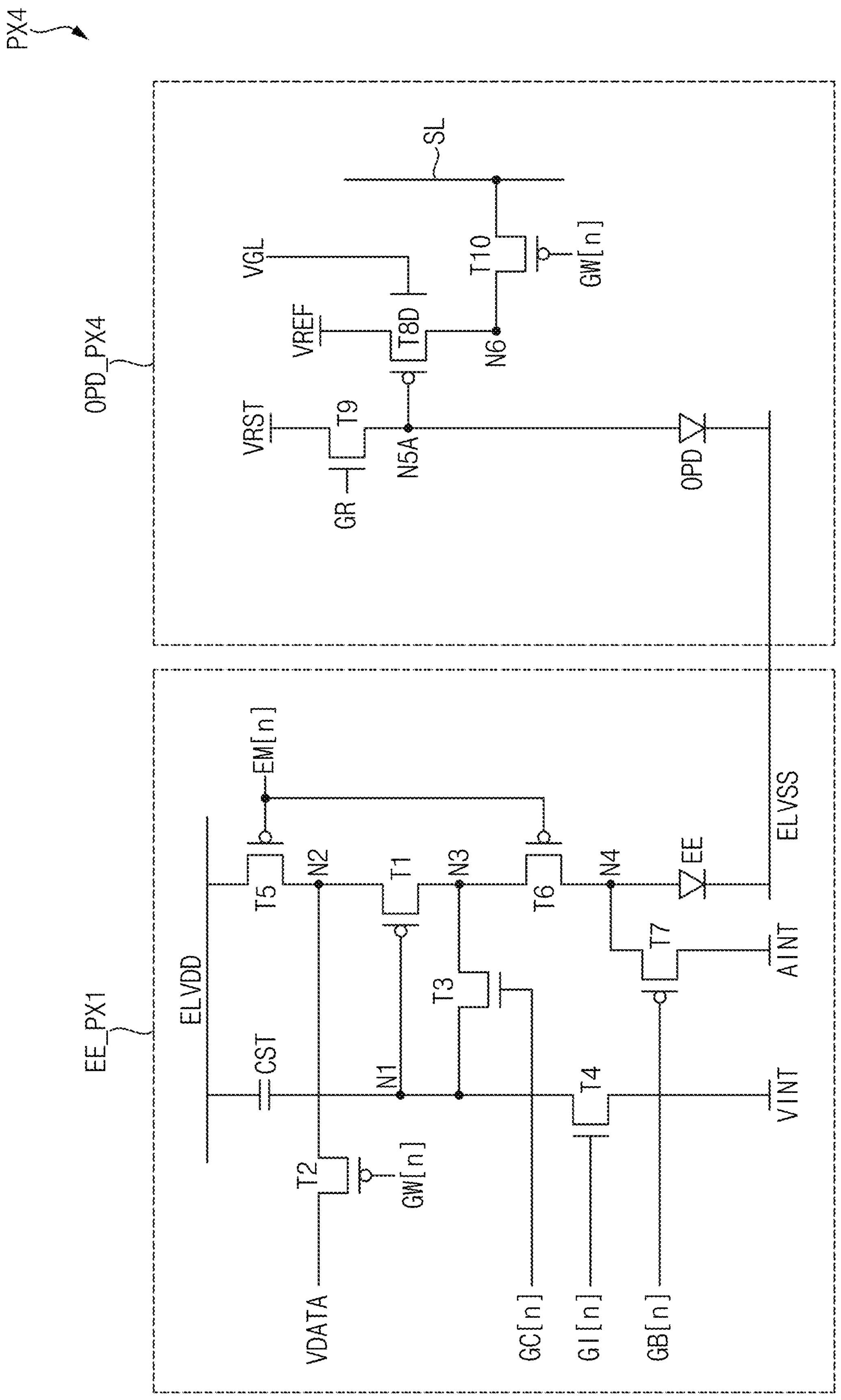
FIG. 9 is a circuit diagram illustrating an example of a pixel circuit of FIG. 1.

FIG. 9 is a circuit diagram illustrating an example of a pixel circuit PX of FIG. 1.

A pixel circuit PX4 may include the light emitter EE_PX1 and a light sensor OPD_PX4. The pixel circuit PX4 may be substantially the same as the pixel circuit PX1 of FIG. 2, except that a low voltage VGL may be applied to a second control electrode of an eighth transistor T8D included in the light sensor OPD_PX4. Accordingly, the same reference numerals will be used and any repetitive explanation concerning the above elements will be omitted.

Referring to FIG. 9, the eighth transistor T8D may include a first control electrode connected to the fifth node NSA, a second control electrode for receiving the low voltage VGL, a first electrode for receiving the reference voltage VREF, and a second electrode connected to the sixth node N6. The eighth transistor T8D may output the sensing current based on a voltage of the fifth node N5A and the low voltage VGL. The low voltage VGL may be applied to the second control electrode of the eighth transistor T8D, so that a stability and a reliability of the pixel circuit PX4 may be improved. Accordingly, an accuracy of the sensing current may be improved. An accuracy of the sensing current may be improved, so that an accuracy of the biomarker may be improved.

Figure 10:
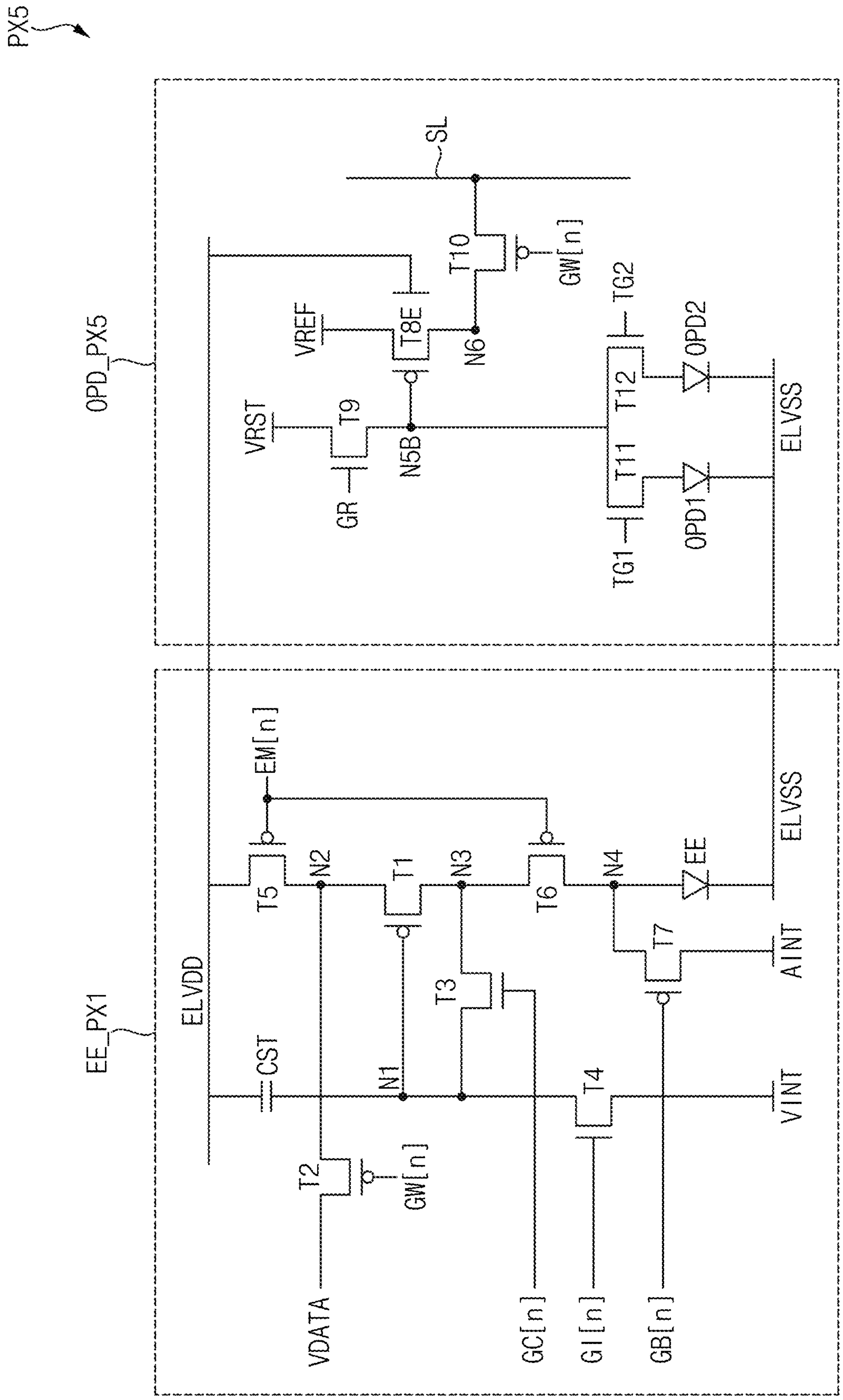
FIG. 10 is a circuit diagram illustrating an example of a pixel circuit of FIG. 1.

FIG. 10 is a circuit diagram illustrating an example of a pixel circuit PX of FIG. 1.

A pixel circuit PX5 may include the light emitter EE_PX1 and a light sensor OPD_PX5. The pixel circuit PX5 may be substantially the same as the pixel circuit PX2 of FIG. 6, except that the first power voltage ELVDD may be applied to a second control electrode of an eighth transistor T8E included in the light sensor OPD_PX5. Accordingly, the same reference numerals will be used and any repetitive explanation concerning the above elements will be omitted.

Referring to FIG. 10, the eighth transistor T8E may include a first control electrode connected to the fifth node N5B, a second control electrode for receiving the first power voltage ELVDD, a first electrode for receiving the reference voltage VREF, and a second electrode connected to the sixth node N6. The eighth transistor T8E may output the sensing current based on a voltage of the fifth node N5B and the first power voltage ELVDD. The first power voltage ELVDD may be applied to the second control electrode of the eighth transistor T8E, so that a stability and a reliability of the pixel circuit PX5 may be improved. Accordingly, an accuracy of the sensing current may be improved. An accuracy of the sensing current may be improved, so that an accuracy of the biomarker may be improved.

Figure 11:
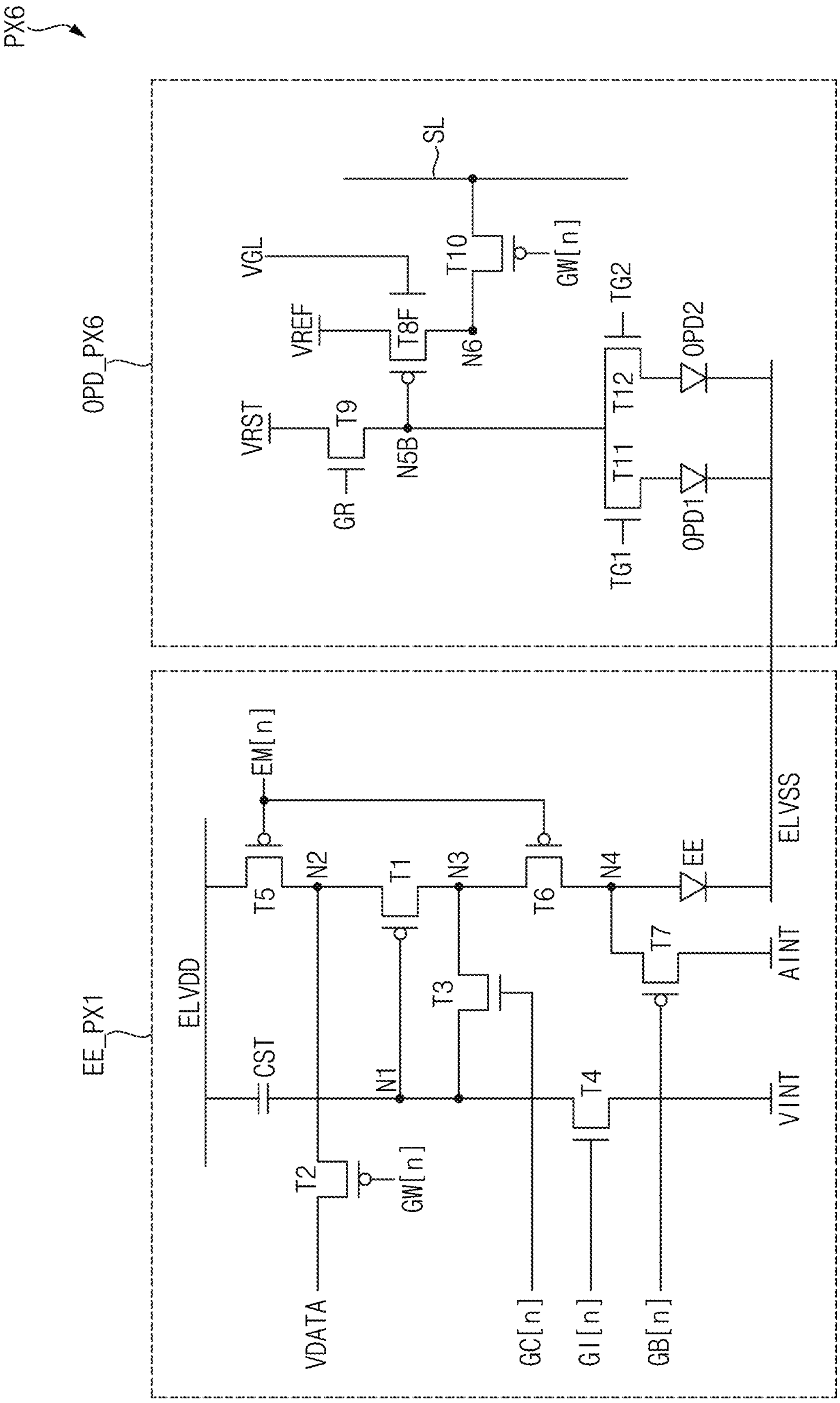
FIG. 11 is a circuit diagram illustrating an example of a pixel circuit of FIG. 1.

FIG. 11 is a circuit diagram illustrating an example of a pixel circuit PX of FIG. 1.

A pixel circuit PX6 may include the light emitter EE_PX1 and a light sensor OPD_PX6. The pixel circuit PX6 may be substantially the same as the pixel circuit PX2 of FIG. 6, except that a low voltage VGL may be applied to a second control electrode of an eighth transistor T8F included in the light sensor OPD_PX6. Accordingly, the same reference numerals will be used and any repetitive explanation concerning the above elements will be omitted.

Referring to FIG. 11, the eighth transistor T8F may include a first control electrode connected to the fifth node N5B, a second control electrode for receiving the low voltage VGL, a first electrode for receiving the reference voltage VREF, and a second electrode connected to the sixth node N6. The eighth transistor T8F may output the sensing current based on a voltage of the fifth node N5B and the low voltage VGL. The low voltage VGL may be applied to the second control electrode of the eighth transistor T8F, so that a stability and a reliability of the pixel circuit PX6 may be improved. Accordingly, an accuracy of the sensing current may be improved. An accuracy of the sensing current may be improved, so that an accuracy of the biomarker may be improved.

Figure 12:
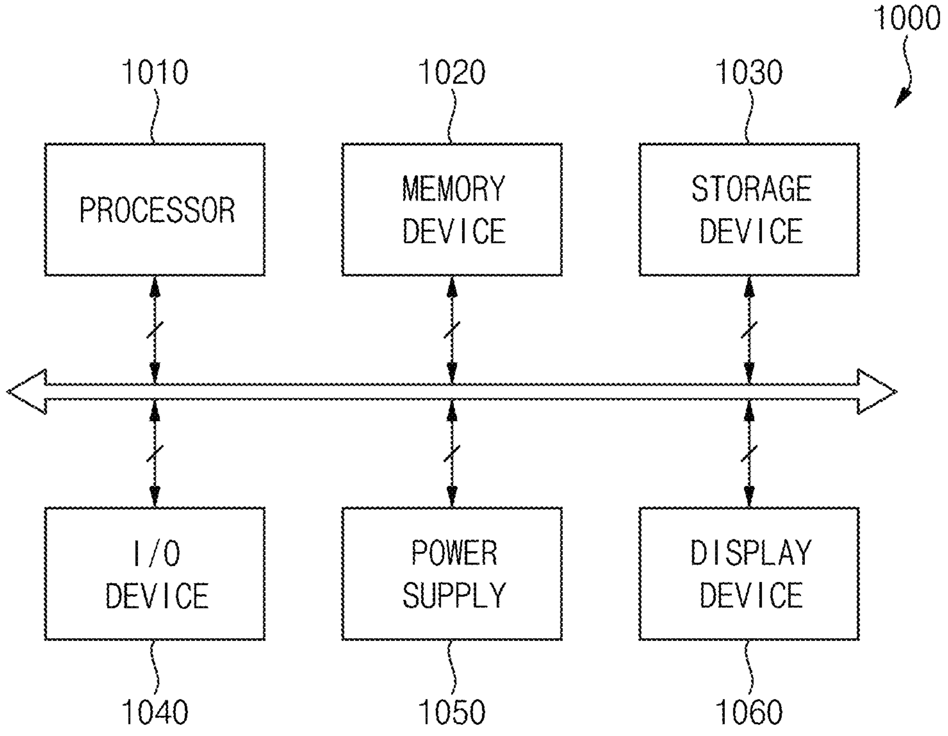
FIG. 12 is a block diagram illustrating an electronic device according to one or more embodiments of the present disclosure.
Figure 13:
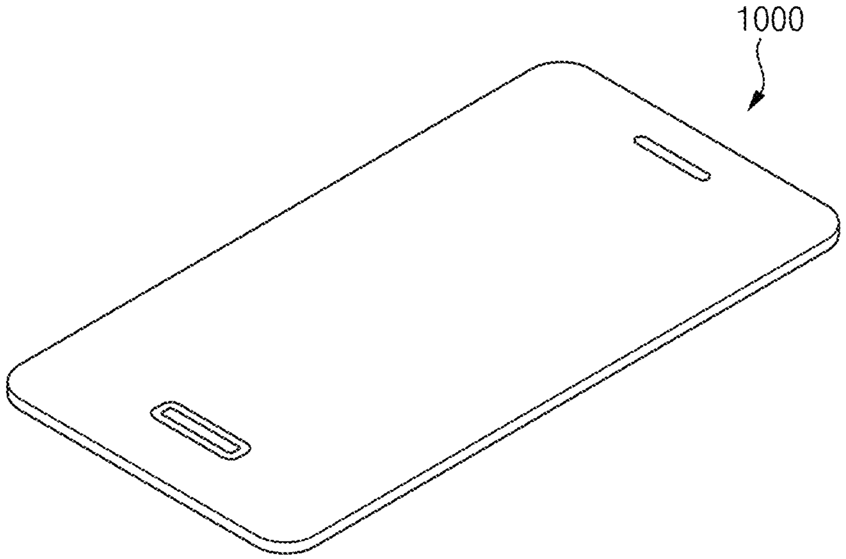
FIG. 13 is a diagram illustrating an example in which the electronic device of FIG. 12 is implemented as a smart phone.

FIG. 12 is a block diagram illustrating an electronic device 1000 according to one or more embodiments of the present disclosure. FIG. 13 is a diagram illustrating an example in which the electronic device of FIG. 12 is implemented as a smart phone.

Referring to FIG. 12, the electronic device 1000 may include a processor 1010, a memory device 1020, a storage device 1030, an input/output (I/O) device 1040, a power supply 1050, and a display device 1060. Here, the display device 1060 may be the display device of FIG. 1. Additionally, the electronic device 1000 may further include a plurality of ports for communicating with a video card, a sound card, a memory card, a universal serial bus (USB) device, other electronic device, etc.

In one or more embodiments, as illustrated in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, an app-on signal, and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 13, the electronic device of the present disclosure is shown implemented as a smartphone, but the present disclosure is not limited thereto. The electronic device may be a television, a monitor, a laptop computer, or a tablet. Additionally, the electronic device may be a car.

The display device according to the embodiments may be applied to a display device included in a computer, a notebook, a mobile phone, a smart phone, a smart pad, a PMP, a PDA, an MP3 player, or the like.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents, but also equivalent structures. Therefore, it is to be understood that the foregoing is illustrative of the present disclosure and is not to be construed as limited to the embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A pixel circuit comprising:

a light emitter configured to emit light, and comprising:
  an emission driving transistor configured to output a driving current based on a data voltage;
  a write transistor configured to apply the data voltage to the emission driving transistor in response to a write gate signal; and
  a light-emitting element configured to emit light based on the driving current; and a light sensor configured to sense the light of the light emitter, and comprising:
  a sensing driving transistor comprising a first control electrode for receiving a reset voltage and a sensing voltage, and a second control electrode for receiving an adjustable photodiode voltage, and configured to generate a sensing current in response to the sensing voltage, the photodiode voltage being configured to be changed based on the sensing current;

a sensing initialization transistor configured to apply the reset voltage to the first control electrode of the sensing driving transistor in response to a photo initialization gate signal; and a sensing output transistor configured to apply the sensing current to a sensing line in response to an output gate signal, wherein the photodiode voltage is configured to be changed based on a sensing code corresponding to the sensing current.

2. The pixel circuit of claim 1, wherein the photodiode voltage is configured to have a voltage level that is lower than a reference photodiode voltage when a number of the sensing code is lower than a number of an initial sensing code.

3. The pixel circuit of claim 2, wherein the initial sensing code is configured to be set in a manufacturing process.

4. The pixel circuit of claim 2, wherein the reference photodiode voltage is configured to be set based on an initial threshold voltage of the sensing driving transistor and the initial sensing code.

5. The pixel circuit of claim 1, wherein the sensing current is based on the sensing voltage and the photodiode voltage.

6. The pixel circuit of claim 1, wherein the light emitter further comprises a light-emitting element initialization transistor configured to apply a light-emitting element initialization voltage to a first electrode of the light-emitting element, and wherein a first electrode of the sensing driving transistor is configured to receive the light-emitting element initialization voltage.

7. The pixel circuit of claim 1, wherein the output gate signal comprises the write gate signal.

8. The pixel circuit of claim 1, wherein the light sensor comprises a photodiode comprising:

a first sub-photodiode configured to generate a first sensing voltage; and a second sub-photodiode configured to generate a second sensing voltage, and wherein the light sensor further comprises:

a first transfer transistor configured to apply the first sensing voltage to the first control electrode of the sensing driving transistor in response to a first transfer signal; and a second transfer transistor configured to apply the second sensing voltage to the first control electrode of the sensing driving transistor in response to a second transfer signal that is different from the first transfer signal.

9. A pixel circuit comprising:

a light emitter; and a light sensor comprising:

a photodiode;

a sensing driving transistor comprising a first control electrode connected to a fifth node, a second control electrode for receiving a photodiode voltage, a first electrode for receiving a reference voltage, and a second electrode connected to a sixth node, the photodiode voltage being configured to be changed based on a sensing current through the sixth node;

a sensing initialization transistor comprising a control electrode for receiving a photo initialization gate signal, a first electrode for receiving a reset voltage, and a second electrode connected to the fifth node; and a sensing output transistor comprising a control electrode for receiving a write gate signal, a first electrode connected to the sixth node, and a second electrode connected to a sensing line, wherein the photodiode voltage is configured to be changed based on a sensing code corresponding to the sensing current.

10. The pixel circuit of claim 9, wherein the photodiode comprises a first electrode connected to the fifth node, and a second electrode for receiving a second power voltage.

11. The pixel circuit of claim 9, wherein the light emitter comprises:

a first transistor comprising a control electrode connected to a first node, a first electrode connected to a second node, and a second electrode connected to a third node;

a second transistor comprising a control electrode for receiving the write gate signal, a first electrode for receiving a data voltage, and a second electrode connected to the second node;

a third transistor comprising a control electrode for receiving a compensation gate signal, a first electrode connected to the third node, and a second electrode connected to the first node;

a fourth transistor comprising a control electrode for receiving an initialization gate signal, a first electrode for receiving an initialization voltage, and a second electrode connected to the first node;

a fifth transistor comprising a control electrode for receiving an emission signal, a first electrode for receiving a first power voltage, and a second electrode connected to the second node;

a sixth transistor comprising a control electrode for receiving the emission signal, a first electrode connected to the third node, and a second electrode connected to a fourth node;

a seventh transistor comprising a control electrode for receiving a light-emitting element initialization gate signal, a first electrode for receiving a light-emitting element initialization voltage, and a second electrode connected to the fourth node; and a light-emitting element comprising a first electrode connected to the fourth node, and a second electrode for receiving a second power voltage, and wherein the reference voltage comprises the light-emitting element initialization voltage.

12. The pixel circuit of claim 11, wherein the photodiode voltage comprises the first power voltage.

13. The pixel circuit of claim 11, wherein the write gate signal is configured to swing between a high voltage, and a low voltage that is lower than the high voltage, and wherein the photodiode voltage comprises the low voltage.

14. The pixel circuit of claim 9, wherein the photodiode comprises a first sub-photodiode and a second sub-photodiode, and wherein the light sensor further comprises:

a first transfer transistor comprising a control electrode for receiving a first transfer signal, a first electrode connected to the fifth node, and a second electrode connected to the first sub-photodiode; and a second transfer transistor comprising a control electrode for receiving a second transfer signal different from the first transfer signal, a first electrode connected to the fifth node, and a second electrode connected to the second sub-photodiode.

15. An electronic device comprising:

a display panel comprising a pixel circuit;

a gate driver configured to apply a gate signal to the display panel;

a data driver configured to apply a data voltage to the display panel;

an emission driver configured to apply an emission signal to the display panel; and a driving controller configured to control the gate driver, the data driver, and the emission driver, wherein the pixel circuit comprises:

a light emitter configured to emit light, and comprising:

an emission driving transistor configured to output a driving current based on the data voltage;

a write transistor configured to apply the data voltage to the emission driving transistor in response to a write gate signal; and a light-emitting element configured to emit light based on the driving current; and a light sensor configured to sense the light of the light emitter, and comprising:

a sensing driving transistor comprising a first control electrode for receiving a reset voltage and a sensing voltage, and a second control electrode for receiving an adjustable photodiode voltage, and configured to generate a sensing current in response to the sensing voltage, the photodiode voltage being configured to be changed based on the sensing current;

a sensing initialization transistor configured to apply the reset voltage to the first control electrode of the sensing driving transistor in response to a photo initialization gate signal; and a sensing output transistor configured to apply the sensing current to a sensing line in response to an output gate signal, wherein the photodiode voltage is configured to be changed based on a sensing code corresponding to the sensing current.

16. The electronic device of claim 15, wherein the photodiode voltage is configured to have a voltage level that is lower than a reference photodiode voltage when a number of the sensing code is lower than a number of an initial sensing code.

17. The electronic device of claim 16, wherein the reference photodiode voltage is configured to be set based on an initial threshold voltage of the sensing driving transistor and the initial sensing code.

18. The electronic device of claim 15, wherein the sensing current is configured to be generated based on the sensing voltage and the photodiode voltage.

19. The electronic device of claim 15, wherein the sensing initialization transistor comprises a control electrode for receiving the photo initialization gate signal, a first electrode for receiving the reset voltage, and a second electrode connected to a fifth node, wherein the sensing driving transistor comprises the first control electrode connected to the fifth node, a first electrode for receiving a reference voltage, and a second electrode connected to a sixth node, and wherein the sensing output transistor comprises a control electrode for receiving the write gate signal, a first electrode connected to the sixth node, and a second electrode connected to the sensing line.

* * * * *